US011352069B2

(12) United States Patent
Taylor

(10) Patent No.: US 11,352,069 B2
(45) Date of Patent: Jun. 7, 2022

(54) LAWN MOWER FENDER

(71) Applicant: Mike Taylor, Spencer, OH (US)

(72) Inventor: Mike Taylor, Spencer, OH (US)

( * ) Notice: Subject to any disclaimer, the term of this patent is extended or adjusted under 35 U.S.C. 154(b) by 59 days.

(21) Appl. No.: 16/902,676

(22) Filed: Jun. 16, 2020

(65) Prior Publication Data

US 2020/0307715 A1 Oct. 1, 2020

Related U.S. Application Data

(63) Continuation of application No. 15/945,976, filed on Apr. 5, 2018, now Pat. No. 10,766,542.

(51) Int. Cl.
*B62D 25/16* (2006.01)

(52) U.S. Cl.
CPC ......... *B62D 25/168* (2013.01); *B62D 25/163* (2013.01); *B60Y 2200/223* (2013.01)

(58) Field of Classification Search
CPC .. B62D 25/161; B62D 25/163; B62D 25/166; B62D 25/168; B60Y 2200/223
See application file for complete search history.

(56) References Cited

U.S. PATENT DOCUMENTS

| | | | | |
|---|---|---|---|---|
| 2,129,579 A | * | 9/1938 | Herold | B60B 33/0002 16/18 CG |
| 2,659,100 A | * | 11/1953 | Cramer | B60B 33/0002 16/22 |
| 3,083,398 A | * | 4/1963 | Swalm | B62B 5/0423 16/18 R |
| 4,025,099 A | * | 5/1977 | Virden | B60B 33/00 293/58 |
| 4,290,166 A | * | 9/1981 | Melara | B60B 33/0028 16/18 CG |
| 4,399,586 A | * | 8/1983 | McCarroll | B60B 33/0002 16/31 R |
| 5,120,073 A | * | 6/1992 | Sealy, Jr. | B62J 15/02 280/152.1 |
| 5,390,393 A | * | 2/1995 | Reppert | B60B 33/0002 16/21 |
| D421,563 S | * | 3/2000 | Hollis | D8/375 |
| 6,349,954 B1 | * | 2/2002 | Deziel | B62D 25/186 280/156 |
| 8,181,310 B2 | * | 5/2012 | Schulte | B60B 33/021 16/35 R |
| 8,444,164 B2 | * | 5/2013 | Mikura | B60T 8/1706 280/279 |
| 2002/0109267 A1 | * | 8/2002 | Herbst | B29C 43/36 264/328.7 |

(Continued)

*Primary Examiner* — Erez Gurari
(74) *Attorney, Agent, or Firm* — Buckingham Doolittle Burroughs; Timothy A. Hodgkiss

(57) ABSTRACT

A fender for a lawn mower having tire and wheel assemblies that are mounted to a yoke of a swivel caster assembly, whereby the yoke pivots through 360 degrees of rotation, includes an arcuate fender body. The fender body is attached to the yoke by a bracket so that it is rotatably carried by the rotating yoke. As such, the fender body is maintained at an optimal position relative to the mower tire and thereby provides desirable deflection of lawn clippings and other debris from the various operational components provided upon the mower deck. This prevents the premature wear of such operational components, thereby decreasing down time and reducing maintenance costs of the mower.

11 Claims, 5 Drawing Sheets

(56) References Cited

U.S. PATENT DOCUMENTS

| | | | |
|---|---|---|---|
| 2003/0150080 A1* | 8/2003 | Yang | B60B 33/0042 16/47 |
| 2006/0032015 A1* | 2/2006 | Wyman | B60B 33/0073 16/45 |
| 2015/0353143 A1* | 12/2015 | Bojan | B62D 25/182 280/848 |
| 2019/0308668 A1* | 10/2019 | Taylor | B62D 25/166 |
| 2020/0031293 A1* | 1/2020 | Conine | B60Q 1/0035 |

* cited by examiner

LAWN MOWER FENDER

CROSS-REFERENCE TO RELATED APPLICATION

This application is a continuation of U.S. patent application Ser. No. 15/945,976 filed Apr. 5, 2018, the contents of which are incorporated herein by reference.

TECHNICAL FIELD

Generally, the various embodiments disclosed herein relate to lawn mowers. In particular, the various embodiments disclosed herein relate to fenders for lawn mowers. More particularly, the various embodiments disclosed herein relate to fenders for lawn mowers having one or more wheels mounted on a swivel caster, such as in the case of a zero-turn lawn mower.

BACKGROUND

Zero-turn lawn mowers, also referred to as zero-turn-radius lawn mowers, include a body in which their front wheels are mounted on rotatable swivel caster assemblies. This allows the zero-turn lawn mower to have exceptional maneuverability. However, when the mower is operated, and due to the nature of these rotatably mounted wheels, lawn clippings and other debris are readily directed onto a mower deck mounted behind the front wheels. Such debris is permitted to become incorporated into the mechanical mechanism, which includes various pulleys and belts, that drives the cutting blades. This causes the premature deterioration or wearing out of the blade drive mechanism, resulting in increased maintenance, increased cost, and increased down time of the mower, all of which are unwanted.

SUMMARY

In light of the foregoing, it is a first aspect of the various embodiments disclosed herein to provide a fender kit for a mower having one or more tire and wheel assemblies each pivotably mounted to a yoke of a swivel caster assembly in which the yoke is pivotably carried about 360 degrees by a swivel housing, the fender kit comprising a fender body having an arcuate shape; and a bracket configured to be attached to the fender body and to the yoke.

It is a further aspect of the various embodiments disclosed herein to provide a mower comprising a mower body having one or more tire and wheel assemblies pivotably mounted to a yoke of a swivel caster assembly in which the yoke is pivotably carried about 360 degrees by a swivel housing; and a fender comprising a fender body having an arcuate shape; and a bracket configured to be attached to the fender body and to said yoke.

DETAILED DESCRIPTION OF THE DRAWINGS

These and other features and advantages of the various embodiments disclosed herein will become better understood with regard to the following description, appended claims, and accompanying drawings wherein:

DETAILED DESCRIPTION

Figure 1:
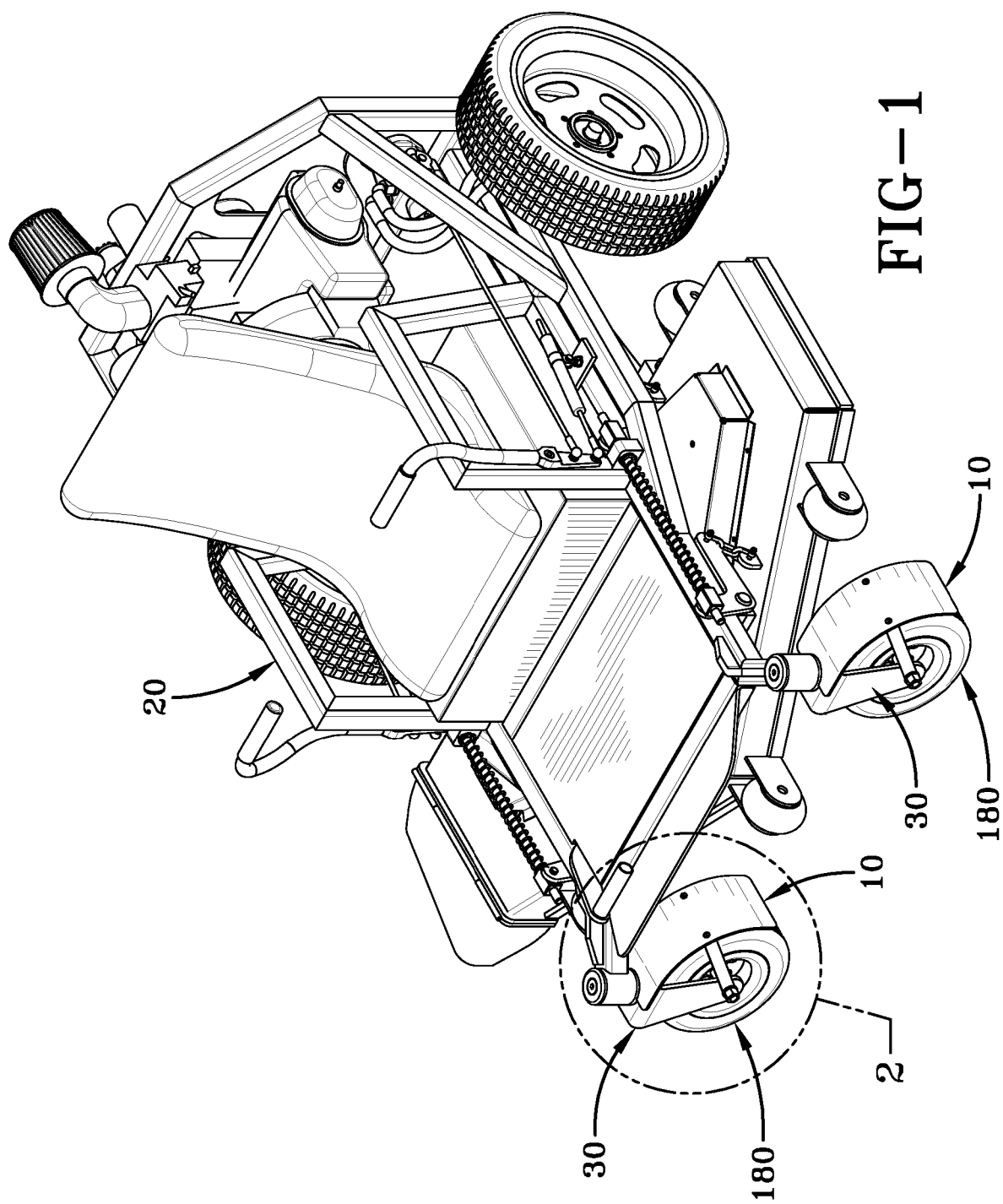
FIG. 1 is a perspective view of a zero-turn lawn mower having tire wheel assemblies and a fenders mounted to swivel casters in accordance with the concepts of the various embodiments disclosed herein.
Figure 2:
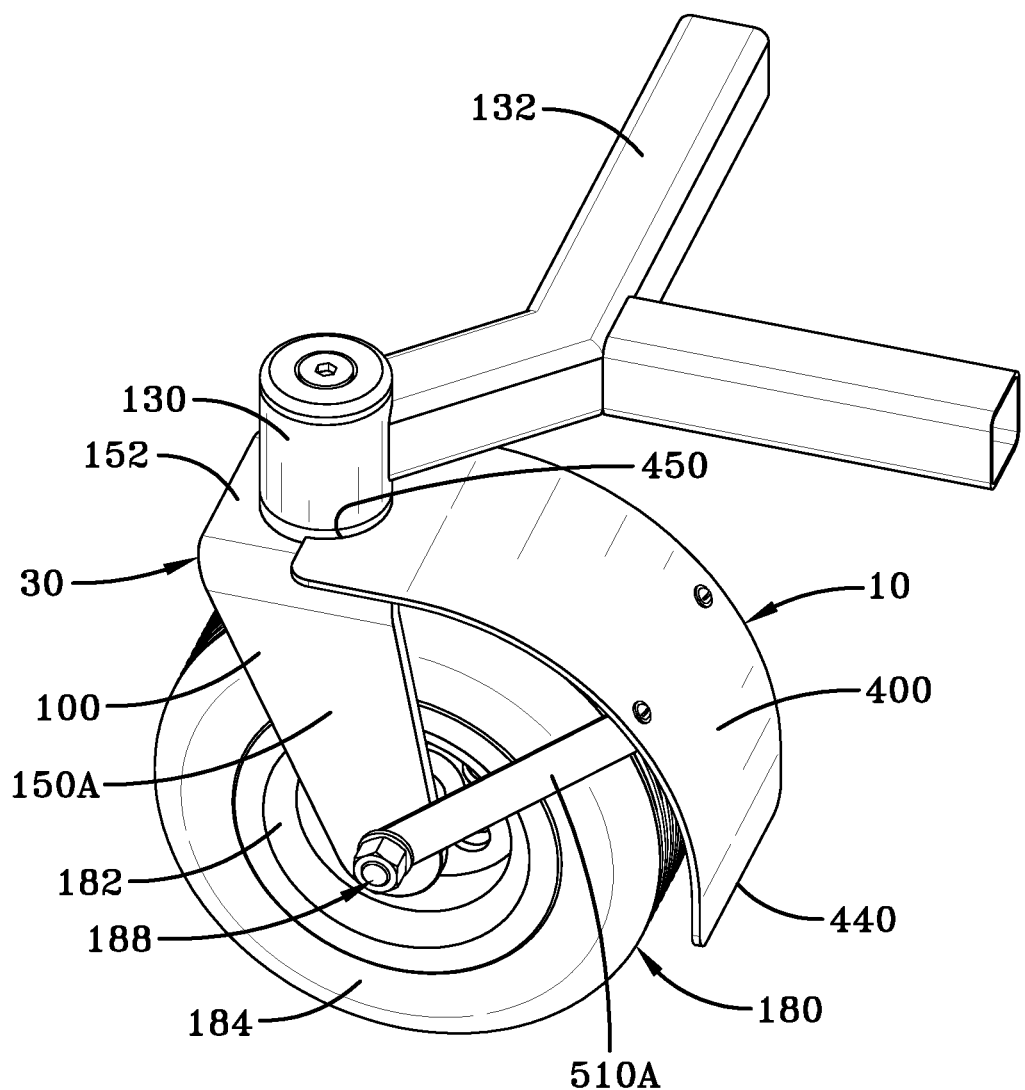
FIG. 2 is a perspective view of the swivel caster and the fender mounted thereto in accordance with the concepts of the various embodiments disclosed herein.

Various embodiments of a fender assembly 10 for use with a mower 20 having one or more wheels that are mounted on swivel caster assemblies 30, as shown in FIG. 1.

The mower 20 includes a zero-turn lawn mower, and a zero-turn radius lawn mower, as well as any mower having tire wheel assemblies for carrying the body of the mower over a surface, such as a lawn, that are mounted to the swivel caster assembly 30 to be discussed in detail below.

The swivel caster assemblies 30, shown clearly in FIGS. 2-5, includes a yoke 100, from which extends a swivel shaft 110. The swivel shaft 110 is configured to be rotatably received within a swivel housing 120 that is attached to the chassis 132 of the mower 20.

The yoke 100 includes two spaced apart yoke arms 150A and 150B that form a gap 151 therebetween. The yoke arms 150A-B are joined at substantially right angles by a cross-member 152, and the yoke arms 150A-B each have an aperture 160 disposed therethrough. The apertures 160 of the yoke arms 150A-B are provided to receive, or to be attached to, an axle 170 that rotatably carries a wheel assembly 180 thereon. The wheel assembly 180 includes a hub 182 and a tire 184 mounted thereon. In some embodiments, the axle 170 may comprise a threaded bolt 186 that is retained to the yoke 100 by a nut and washer assembly 188.

Figure 3:
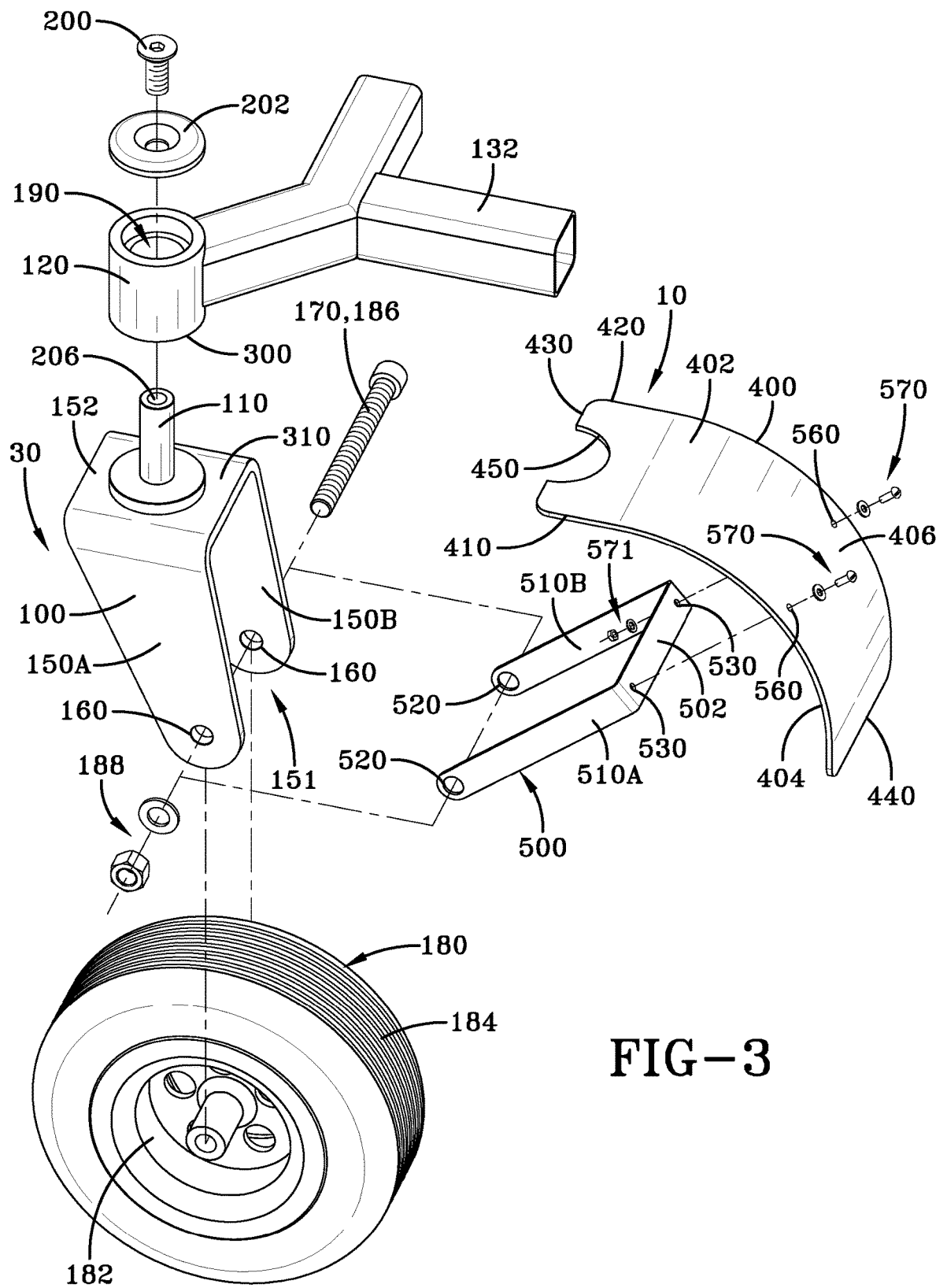
FIG. 3 is an exploded view of the swivel caster and the fender in accordance with the concepts of the various embodiments disclosed herein.

The swivel shaft 110 extends from the cross-member 152 of the yoke 100 at a substantially right angle, and is cylindrical in shape and freely pivots or rotates 360 degrees within the swivel housing 120. As a result of this rotation, the swivel caster assembly 30 allows the yoke 100 and the wheel assembly 180 carried thereby to rotate or pivot freely together through 360 degrees. The swivel housing 120 includes a generally cylindrical cavity 190 to accommodate the cylindrical shape of the swivel shaft 110 received therein. In some embodiments, the swivel shaft 110 may be rotatably carried within the swivel housing 120 by suitable bearings and/or bushings. In addition, in some embodiments, the swivel shaft 110 may be retained within the swivel housing 120 by any suitable fastener or device, such as retaining pins, retaining clips, or retaining clamps and the like. In one embodiment, as shown in FIG. 3, the swivel shaft 100 may be retained within the swivel housing 120 using a screw 200 that is received through a retaining washer 202, which is threadably received within an aperture 206 disposed in an end of the swivel shaft 110 that is distal to the wheel assembly 180.

It should be appreciated that in some embodiments, a bottom edge 300 of the swivel housing 120 is spaced away from a top surface 310 of the cross-member 152 of the yoke 100 to form a gap 330.

The components of the swivel caster assembly 30 may be formed of any suitable material including metal, polymeric material, or composite material.

The fender assembly 10 includes a fender body 400 that is curved or arcuate in shape. In some embodiments the dimension of the radius of curvature is configured to match or follow that of the tire 180, but is not required, as other dimensions may be used. Continuing, the fender body 400 is formed of a continuous or elongated body section 402 having an inner surface 404 and an outer surface 406. The fender body 400 is bounded by lateral edges 410 and 420 that are joined at top and bottom edges 430 and 440, respectively. Disposed in the top edge 430 is an arcuate, curved or concave cut-out 450, but may be omitted in some embodiments of the fender body 400. The body section 402 may have any suitable thickness, and may be formed form any suitable material, such as metal material, polymeric material, including plastic, as well as composite materials, and the like. While the edges of the fender body 400 are discussed herein as forming a substantially rectangular shape that is bent about a desired radius of curvature, the edges of the fender body 400 may be rectilinear, curvilinear, or any combination thereof. Furthermore, the top and bottom edges 430 and 440 may have different dimensions, and the lateral edges 410 and 420 may be different dimensions.

The fender body 400 is mounted to the yoke 100 by a bracket 500. The bracket includes spaced arms 510A and 510B that are joined by a cross-member 502. Disposed through each of the arms 510A-B are mounting apertures 520, and disposed through the cross-member 502 is one or more fender mounting apertures 530. The mounting apertures 520 are configured to receive or be attached to the axle 170, so as to retain each of the arms 510A and 510B adjacent to respective yoke arms 150A and 150B. In addition, the fender apertures 530 are provided to allow the bracket 500 to be attached to the fender body apertures 560 disposed through the fender body 400 using any suitable fastener, such as screw and washer assemblies 570 for retention by washer and nut assemblies 571. It should be appreciated that the bracket 500 may be configured to use only one of the arms 510A or 510B. In addition, the bracket 500 may be formed in some embodiments without the use of the cross-member 152. In some embodiments, the bracket 500 is attached to the fender body 400 at or near the apex of the curvature of the fender body 400. However, the bracket 500 may be attached to the fender body 400 at any position on the fender body 400. In addition, in some embodiments, the bracket 500 may be positioned so that the arms 510A-B are at about a 45 degree angle relative to a vertical axis extending through the swivel housing 120. However, the arms 510A-B may be positioned at any desired angle relative to such vertical axis. The bracket 500 may be formed of any suitable material, such as metallic material, polymeric material, or composite material. In some embodiments, the bracket 500 may be made integral with the fender body 400 to form a single piece. In further embodiments, the bracket, fender body 400 and yoke 100 may be formed as an integral piece.

Thus, when the fender body 400 is attached to the yoke 100 by the bracket 500, the curvature of the fender body 400 allows the fender body 400 to clear and avoid contact with the chassis 132 of the mower 20 as the yoke 100 is rotated through its 360 degrees of rotation. That is, during operation of the mower 20, the fender body 400 is freely carried by the rotating yoke 110 through the 360 degrees of rotation in an uninhibited manner. Thus, the fender body 400 is able to deflect debris and lawn clippings during the forward movement of the mower 20, while being rotatably carried by the pivoting or swiveling yoke 100. Such a configuration of the fender body 400 avoids the difficulties that would occur if such fenders were not rotatably carried by the swiveling yoke 100, but statically affixed to the chassis 132 of the mower, especially in retro-fit situations where the chassis 132 design may vary greatly from one lawn mower to the next. Further, by configuring the fender body 400 for attachment to the swiveling yoke 100, the fender 400 is made compact and enabled to accommodate a large number of mowers 20, thereby avoiding operational interference with the various chassis structures utilized across different mower 20 designs.

It should be appreciated that in some embodiments, the bracket arms 510A-B may be positioned to the inside of the yoke arms 150A-B so as to be within the gap 151, or may be positioned to the outside of the yoke arms 150A-B.

In other embodiments, the bracket 500 may be attached to any portion of the yoke 100, including the yoke arms 150A-B, and the cross-member 152. The bracket 500 may be attached to the yoke 100 using any suitable means, including removable or non-removable attachment means, such as nuts/bolts, welding, adhesive, rivets, and the like. For example, in some embodiments, the mounting apertures 520 of the bracket 500 may be used to mount the bracket to any portion of the yoke arms 150A-B.

Figure 4:
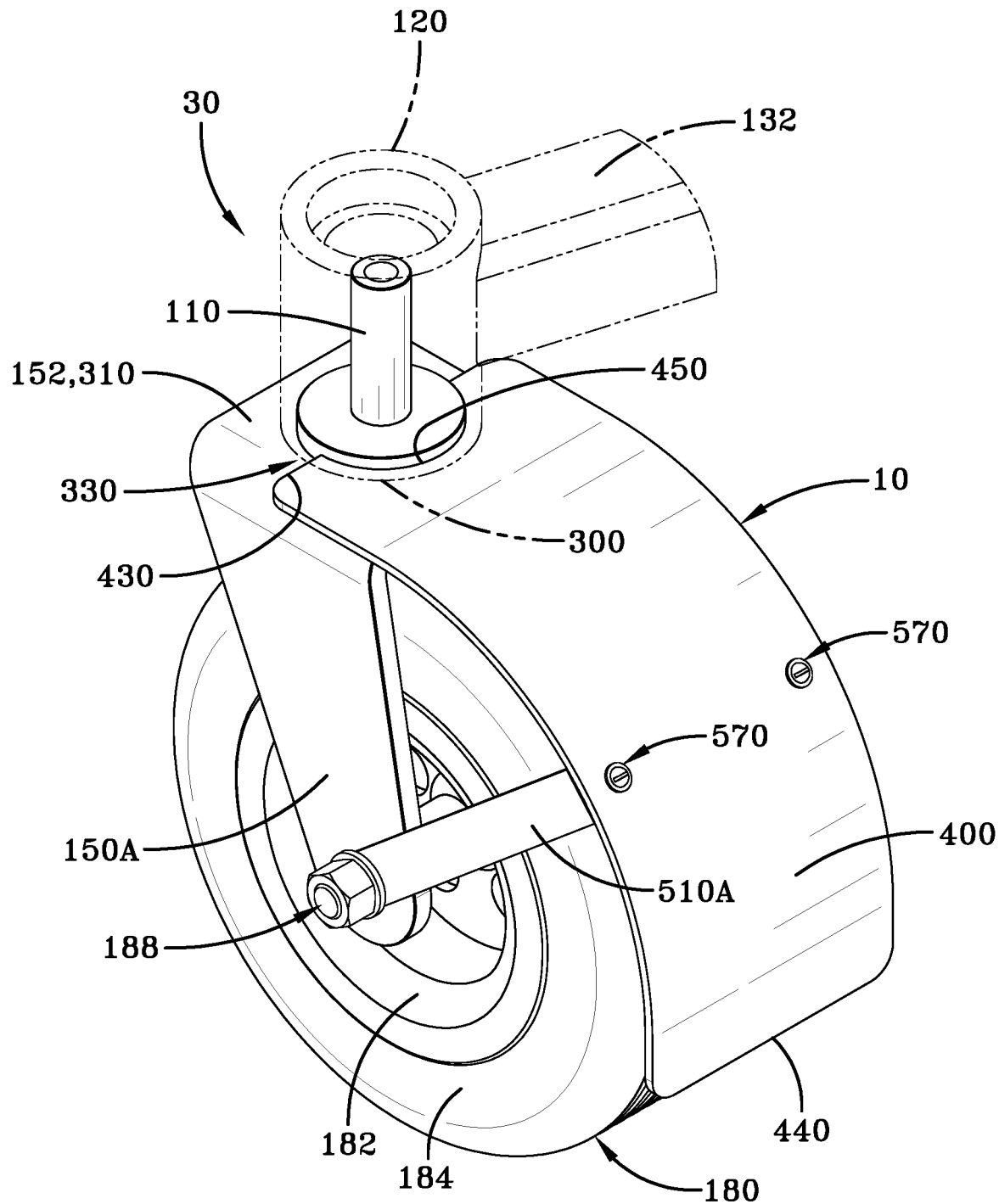
FIG. 4 is another perspective view of the swivel caster and the fender in accordance with the concepts of the various embodiments disclosed herein.
Figure 5:
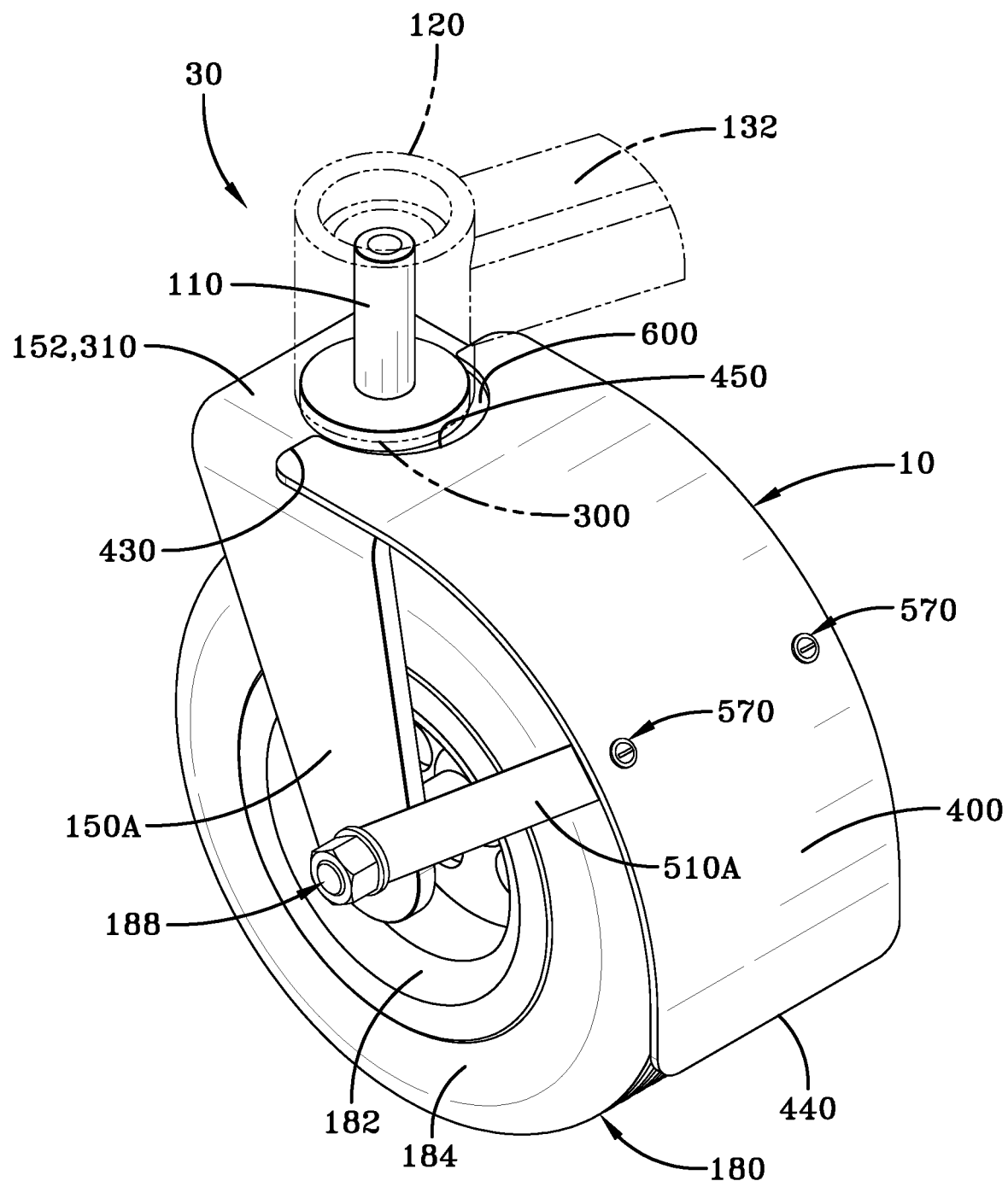
FIG. 5 is still another perspective view of the swivel caster and the fender in accordance with the concepts of the various embodiments disclosed herein.

In some embodiments, the concave or arcuate cut-out 450 of the fender body 400 may be positioned within the gap 330 that is formed between a bottom edge 300 of the swivel housing 120 and the top surface 310 of the cross-member 152 of the yoke 100, as shown in FIG. 4. Thus, in some cases, the cut-out 450 is captured or retained within the gap 330, so that the swivel housing 120 applies a downward force to the top edge 430 of the fender body 400. However, in other embodiments, the cut-out 450, due to the curvature of the fender body 400, is not captured or retained within the gap 330, but merely rests within the gap 330 without the swivel housing 120 applying any downward force to the top edge 430 of the fender body 400. In still other embodiments, as shown in FIG. 5, the fender body 400 may be configured so that the cut-out 450 is spaced away from the swivel housing 120 by a gap 600.

It is also contemplated that the fender body 400 may have any suitable dimension to accommodate wheels 182 and tires 184 of various sizes, including radius of curvatures, width, and profiles for example.

In still other embodiments, the top edge 430 of the fender body 400 may be configured to extend over top of or underneath at least a portion of the yoke cross-member 152. However, in some embodiments, the fender body 400 may extend so that it does not extend over the top of or underneath the yoke cross-member 152. In other embodiments, the top edge 430 of the fender body 400 may be spaced apart from the yoke 100 by a gap.

In other embodiments, the fender body 400 and the bracket 500 may be provided as unassembled components in a kit for retrofit attachment to the mower 20, or alternatively may be attached to the mower at the time of the original manufacture of the mower 20.

Additionally, the fender body 400 may extend along its longitudinal axis any desired length to provide the desired coverage of the tire 184.

Therefore, it can be seen that the objects of the various embodiments disclosed herein have been satisfied by the structure and its method for use presented above. While in accordance with the Patent Statutes, only the best mode and preferred embodiments have been presented and described in detail, with it being understood that the embodiments disclosed herein are not limited thereto or thereby. Accordingly, for an appreciation of the true scope and breadth of the embodiments, reference should be made to the following claims.

What is claimed is:

1. A fender kit for a mower having one or more tire and wheel assemblies each rotatably mounted to a yoke of a swivel caster assembly in which the yoke is pivotably carried by a swivel housing, the fender kit comprising:
a fender body having an arcuate shape; and
a bracket configured to be attached to said fender body and to the yoke,
wherein said bracket includes first and second apertures that are configured to be attached to an axle attached to the yoke that carries the tire and wheel assembly, and wherein said fender body is only attached to the swivel caster assembly by said bracket.

2. The fender kit of claim 1, wherein said bracket includes a pair of spaced legs in which said first and second apertures are respectively disposed.

3. The fender kit of claim 1, wherein said bracket and said fender body are integral with one another.

4. The fender of claim 1, wherein said fender body includes an arcuate recess.

5. The fender of claim 4, wherein said arcuate recess is configured to be placed proximate to an arcuate body of the swivel housing.

6. A fender for a mower having one or more tire and wheel assemblies each rotatably mounted to a yoke of a swivel caster assembly in which the yoke is pivotably carried by a swivel housing, the fender comprising:
a fender body having an arcuate shape; and
a bracket attached to said fender body and attached to the yoke,
wherein said bracket includes first and second apertures that are configured to be attached to an axle attached to the yoke that carries the tire and wheel assembly, and wherein said fender body is configured to only be attached to the swivel caster assembly by said bracket.

7. The fender of claim 6, wherein said bracket includes a pair of spaced legs in which said first and second apertures are respectively disposed.

8. The fender of claim 6, wherein said fender body includes an arcuate recess.

9. The fender of claim 8, wherein said arcuate recess is configured to be received within a gap formed between the yoke and the swivel housing.

10. The fender of claim 9, wherein said arcuate recess is configured to be placed proximate to an arcuate body of the swivel housing.

11. The fender of claim 6, wherein said bracket and said fender body are integral with one another.

* * * * *